US007629046B2

(12) United States Patent
van Driesten (10) Patent No.: US 7,629,046 B2
(45) Date of Patent: Dec. 8, 2009

(54) REUSABLE CLOSURES FOR PACKAGES AND METHODS OF MAKING AND USING THE SAME

(75) Inventor: Sjoerd Johannes van Driesten, Bodegraven (NL)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 10/796,758

(22) Filed: Mar. 9, 2004

(65) Prior Publication Data

US 2004/0191459 A1  Sep. 30, 2004

Related U.S. Application Data

(60) Provisional application No. 60/454,192, filed on Mar. 12, 2003.

(51) Int. Cl.
B32B 7/14 (2006.01)
(52) U.S. Cl. ............... 428/355 RA; 428/351; 428/355 EN; 428/355 N
(58) Field of Classification Search ............. 428/343, 428/351, 352, 355 R, 355 RA, 355 BL, 355 N, 428/355 EN
See application file for complete search history.

(56) References Cited

U.S. PATENT DOCUMENTS

| 3,113,986 A | 12/1963 | Breslow et al. | 260/683.9 |
| 3,154,239 A | 10/1964 | Madsen | 229/62 |
| 3,251,905 A | 5/1966 | Zelinski | 260/879 |
| 3,300,370 A | 1/1967 | Epstein, et al. | 161/190 |
| 3,390,207 A | 6/1968 | Moss et al. | 260/879 |
| 3,598,887 A | 8/1971 | Darcy et al. | 260/879 |
| 3,620,988 A | 11/1971 | Cohen | 260/17.4 |
| 3,639,521 A | 2/1972 | Hsieh | 260/880 |
| 3,648,923 A | 3/1972 | Young | 229/67.3 |
| 3,691,140 A | 9/1972 | Silver | 260/78.5 |
| 3,726,945 A | 4/1973 | Bottenbruch et al. | 260/857 |
| 3,827,625 A | 8/1974 | Miller | 229/62 |
| 3,912,581 A | 10/1975 | Fink et al. | 162/164 |
| 3,997,383 A | 12/1976 | Bieler et al. | 156/244 |
| 4,166,152 A | 8/1979 | Baker et al. | 428/522 |
| 4,173,669 A | 11/1979 | Ashida et al. | 428/35 |
| 4,208,356 A | 6/1980 | Fukawa et al. | 525/89 |
| 4,219,627 A | 8/1980 | Halasa et al. | 525/89 |

(Continued)

FOREIGN PATENT DOCUMENTS

DE   38 05 223 A1   8/1989

(Continued)

OTHER PUBLICATIONS

Editorial, "Reclosable Pet Food Bag Label Is a Breed Apart," Packaging Digest, Jun. 2000, p. 68, New York.

(Continued)

Primary Examiner—Thao T. Tran (57) ABSTRACT

Adhesive articles, particularly useful as reusable closures, comprising a moisture resistant substrate and a removable adhesive covering at least a portion substrate surface, the adhesive having a Moist Loop Test result of at least about 25 N/25 mm at a test plate temperature of 5° C. The closure may also include a permanent adhesive covering another portion of the substrate surface. The adhesive articles provide easy application to packages and exhibit good adhesion performance in the presence of moisture, such as from refrigerated or frozen food packaging.

19 Claims, 4 Drawing Sheets

U.S. PATENT DOCUMENTS

| | | | |
|---|---|---|---|
| 4,226,952 A | 10/1980 | Halasa et al. | 525/192 |
| 4,230,830 A | 10/1980 | Tanny et al. | 525/222 |
| 4,233,367 A | 11/1980 | Ticknor et al. | 428/476.3 |
| 4,239,826 A | 12/1980 | Knott, II et al. | 428/35 |
| 4,254,169 A | 3/1981 | Schroeder | 428/35 |
| 4,260,061 A | 4/1981 | Jacobs | 383/203 |
| 4,274,848 A | 6/1981 | La Gro | 96/6 |
| 4,347,332 A | 8/1982 | Odorzynski et al. | 524/169 |
| 4,411,659 A | 10/1983 | Jensen et al. | 604/332 |
| 4,427,825 A | 1/1984 | Degrassi et al. | 525/56 |
| 4,441,613 A | 4/1984 | Hain et al. | 206/621 |
| 4,457,960 A | 7/1984 | Newsome | 428/35 |
| 4,461,808 A | 7/1984 | Mollison | 428/475.8 |
| 4,468,427 A | 8/1984 | Degrassi et al. | 428/220 |
| 4,479,818 A | 10/1984 | Briggs et al. | 55/385.4 |
| 4,490,145 A | 12/1984 | Campbell | 604/333 |
| 4,495,318 A | 1/1985 | Howard | 524/375 |
| 4,500,021 A | 2/1985 | Bildusas | 225/49 |
| 4,512,479 A | 4/1985 | Hain et al. | 206/632 |
| 4,543,139 A | 9/1985 | Freedman et al. | 156/152 |
| 4,557,780 A | 12/1985 | Newsome et al. | 156/244.11 |
| 4,578,429 A | 3/1986 | Gergen et al. | 525/291 |
| 4,584,217 A | 4/1986 | McClintock | 428/40 |
| 4,598,112 A | 7/1986 | Howard | 524/78 |
| 4,599,265 A | 7/1986 | Esmay | 428/355 |
| 4,622,799 A | 11/1986 | Boston | 53/415 |
| 4,629,663 A | 12/1986 | Brown et al. | 428/343 |
| 4,645,711 A | 2/1987 | Winslow et al. | 428/355 |
| 4,657,970 A | 4/1987 | Shiraki et al. | 525/57 |
| 4,687,711 A | 8/1987 | Vietto et al. | 428/515 |
| 4,690,322 A | 9/1987 | Burns | 229/80 |
| 4,724,185 A | 2/1988 | Shah | 428/339 |
| 4,771,891 A * | 9/1988 | Sorensen et al. | 206/459.5 |
| 4,786,696 A | 11/1988 | Bohnel | 526/88 |
| 4,795,781 A | 1/1989 | Miyamoto et al. | 525/58 |
| 4,795,782 A | 1/1989 | Lutz et al. | 525/66 |
| 4,826,493 A | 5/1989 | Martini et al. | 604/327 |
| 4,828,915 A | 5/1989 | Schroeder et al. | 428/332 |
| 4,833,179 A | 5/1989 | Young et al. | 522/183 |
| 4,834,731 A | 5/1989 | Nowak et al. | 604/339 |
| 4,840,270 A | 6/1989 | Caputo et al. | 206/205 |
| 4,846,504 A * | 7/1989 | MacGregor et al. | 283/102 |
| 4,851,290 A | 7/1989 | Vicik | 428/334 |
| 4,871,265 A | 10/1989 | Peck | 383/89 |
| 4,880,592 A | 11/1989 | Martini et al. | 264/514 |
| 4,902,141 A | 2/1990 | Linnewiel | 383/61 |
| 4,906,495 A | 3/1990 | Martini et al. | 428/36.7 |
| 4,911,563 A | 3/1990 | Ciani | 383/89 |
| 4,911,963 A | 3/1990 | Lustig et al. | 428/36.91 |
| 4,915,289 A | 4/1990 | Hatano et al. | 229/123.1 |
| 4,952,628 A | 8/1990 | Blatz | 525/58 |
| 4,973,323 A | 11/1990 | Kaczmarek et al. | 604/339 |
| 4,983,171 A | 1/1991 | Schirmer | 604/332 |
| 5,009,648 A | 4/1991 | Aronoff et al. | 604/332 |
| 5,013,307 A | 5/1991 | Broida | 604/338 |
| 5,035,518 A | 7/1991 | McClintock | 383/70 |
| 5,040,903 A | 8/1991 | Schramer | 383/70 |
| 5,041,325 A | 8/1991 | Larson et al. | 428/156 |
| 5,043,205 A | 8/1991 | Perazzo et al. | 428/215 |
| 5,044,776 A | 9/1991 | Schramer et al. | 383/89 |
| 5,051,259 A | 9/1991 | Olsen et al. | 424/443 |
| 5,053,259 A | 10/1991 | Vicik | 428/36.91 |
| 5,077,109 A | 12/1991 | Lustig et al. | 428/36.91 |
| 5,110,390 A | 5/1992 | Martini et al. | 156/244.11 |
| 5,125,211 A | 6/1992 | O'Brien et al. | 53/412 |
| 5,141,793 A | 8/1992 | Fontanilla | 428/42 |
| 5,180,635 A | 1/1993 | Plamthottam et al. | 428/345 |
| 5,203,806 A | 4/1993 | Broida | 604/338 |
| 5,246,751 A | 9/1993 | White et al. | 428/35.4 |
| 5,290,842 A | 3/1994 | Sasaki et al. | 524/271 |
| 5,322,876 A | 6/1994 | Sasaki et al. | 524/366 |
| 5,330,454 A | 7/1994 | Klingler et al. | 604/338 |
| 5,346,482 A | 9/1994 | Metz et al. | 604/338 |
| 5,348,546 A | 9/1994 | Norton | 604/333 |
| 5,366,087 A * | 11/1994 | Bane | 206/459.5 |
| 5,407,713 A | 4/1995 | Wilfong et al. | 428/34.1 |
| 5,417,678 A | 5/1995 | Baumann et al. | 604/333 |
| 5,427,849 A | 6/1995 | McClintock et al. | 428/353 |
| 5,437,595 A | 8/1995 | Smith | 493/213 |
| 5,455,091 A | 10/1995 | Oreglia et al. | 428/36.1 |
| 5,470,526 A | 11/1995 | Wilfong et al. | 428/36.6 |
| 5,470,624 A | 11/1995 | Oreglia et al. | 428/36.1 |
| 5,492,943 A | 2/1996 | Stempel | 523/111 |
| 5,496,295 A | 3/1996 | Wilfong et al. | 604/332 |
| 5,549,587 A | 8/1996 | Norton | 604/333 |
| 5,567,488 A | 10/1996 | Allen et al. | 428/34.1 |
| 5,567,489 A | 10/1996 | Allen et al. | 428/34.1 |
| 5,582,820 A | 12/1996 | Yamamoto et al. | 424/76.6 |
| 5,582,889 A | 12/1996 | Pedrini | 428/41.9 |
| 5,606,846 A | 3/1997 | Raby et al. | 53/415 |
| 5,616,385 A | 4/1997 | Rothrum et al. | 428/40.1 |
| 5,618,276 A | 4/1997 | Leise, Jr. et al. | 604/336 |
| 5,623,011 A | 4/1997 | Bernard | |
| 5,643,375 A | 7/1997 | Wilfong et al. | 156/244.24 |
| 5,656,705 A | 8/1997 | Mallya et al. | 526/233 |
| 5,658,625 A | 8/1997 | Bradfute et al. | 428/34.9 |
| 5,663,228 A | 9/1997 | Sasaki et al. | 524/271 |
| 5,681,627 A | 10/1997 | Mueller | 428/35.2 |
| 5,714,225 A | 2/1998 | Hansen et al. | 428/114 |
| 5,730,919 A | 3/1998 | Wilfong et al. | 264/173.11 |
| 5,776,120 A | 7/1998 | Shelley et al. | 604/339 |
| 5,824,380 A | 10/1998 | Hagen | 428/41.9 |
| 5,846,620 A | 12/1998 | Compton | 428/35.7 |
| 5,855,434 A | 1/1999 | Hagen | 383/89 |
| 5,857,582 A | 1/1999 | Schulz | 220/269 |
| 5,865,819 A | 2/1999 | Cisko, Jr. et al. | 604/339 |
| 5,873,483 A | 2/1999 | Gortz et al. | 220/269 |
| 5,888,335 A | 3/1999 | Kobe et al. | 156/306.3 |
| 5,895,694 A | 4/1999 | Zavadsky et al. | 428/36.7 |
| 5,938,647 A | 8/1999 | Smith | 604/332 |
| 5,972,455 A | 10/1999 | Barry | 428/40.1 |
| 5,983,604 A | 11/1999 | Wilfong et al. | 53/449 |
| 5,989,235 A | 11/1999 | Quacquarella et al. | 604/332 |
| 5,992,674 A | 11/1999 | Schulz | 220/359.4 |
| 5,998,018 A | 12/1999 | Murakami et al. | |
| 6,025,071 A * | 2/2000 | Cameron et al. | 428/355 RA |
| 6,048,100 A | 4/2000 | Thrall et al. | 383/86 |
| 6,056,141 A * | 5/2000 | Navarini et al. | 220/269 |
| 6,093,276 A | 7/2000 | Leise, Jr. et al. | 156/249 |
| 6,096,387 A | 8/2000 | Decker | 427/510 |
| 6,106,507 A | 8/2000 | Botten et al. | 604/338 |
| 6,110,586 A | 8/2000 | Johnson | 428/352 |
| 6,113,271 A | 9/2000 | Scott et al. | 383/211 |
| 6,120,184 A | 9/2000 | Laurence et al. | 383/205 |
| 6,129,716 A | 10/2000 | Steer | 604/333 |
| 6,135,986 A | 10/2000 | Leisner et al. | 604/322 |
| 6,143,383 A | 11/2000 | Giori | 428/35.2 |
| 6,197,010 B1 | 3/2001 | Leise, Jr. et al. | 604/338 |
| 6,214,935 B1 | 4/2001 | Sasaki et al. | 525/89 |
| 6,231,553 B1 | 5/2001 | Hulett | 604/333 |
| 6,241,390 B1 | 6/2001 | Schneck | 383/203 |
| 6,258,423 B1 | 7/2001 | Giori | 428/36.7 |
| 6,293,930 B1 | 9/2001 | Brunsgaard et al. | 604/322 |
| 6,299,355 B1 | 10/2001 | Schneck | 383/205 |
| 6,315,448 B1 | 11/2001 | Thrall | 383/205 |
| 6,376,095 B1 | 4/2002 | Cheung et al. | 428/516 |
| 6,436,500 B1 | 8/2002 | Yingst et al. | 428/40.1 |
| 6,517,243 B2 | 2/2003 | Huffer et al. | 383/88 |
| 6,688,078 B2 | 2/2004 | Mauclair et al. | 53/412 |
| 2002/0023924 A1 | 2/2002 | Wisniewski et al. | 220/359.1 |

FOREIGN PATENT DOCUMENTS

EP        0 353 907 A2        2/1990

| | | | |
|---|---|---|---|
| EP | 0661154 | | 7/1995 |
| EP | 1026215 | A1 * | 8/2000 |
| EP | 1 184 436 | A1 | 3/2002 |
| WO | 99/14041 | | 3/1999 |
| WO | 99/20709 | | 4/1999 |
| WO | 00/46316 | | 8/2000 |
| WO | WO 00/46316 | * | 8/2000 |

OTHER PUBLICATIONS

PCT/US02/23499; PCT International Search Report mailed Dec. 19, 2002.

Adhesive Data Sheet for C2075, a global rubber based, new generation, freezer grade ad . . . , Jul. 23, 2001, pp. 1-2.
Standard Product Data Sheet #15281, pp. 1-2.
Adhesive Data Sheet for S2045, A general purpose permanent, rubber based adhesive, Jul. 23, 2001, pp. 1-2.
Product Data Sheets for BA0112 Fasson PP Top White / UVR145 / BG45 white, Oct. 8, 2001, pp. 1-2.
Supplementary Partial European Search Report mailed Jul. 27, 2007 in corresponding European Patent Application No. 04 718 821.4.
Supplementary Partial European Search Report mailed May 30, 2007 in corresponding European Patent Application No. 04 718 821.4.

* cited by examiner

REUSABLE CLOSURES FOR PACKAGES AND METHODS OF MAKING AND USING THE SAME

This application claims the benefit of provisional application Ser. No. 60/454,192 filed Mar. 12, 2003.

TECHNICAL FIELD OF THE INVENTION

This invention relates to adhesive articles that are closures for packages, such as frozen food packages. In particular, the adhesive articles have at least one removable adhesive that has at least a value of about 0.2 N/25 mm at a test plate temperature of 25° C. in the Moist Loop Test. The removable adhesive is used either alone or in combination with a permanent adhesive.

BACKGROUND OF THE INVENTION

Packaging that does not have an integrated means of self-sealing has posed problems for consumers. Dry foods packages such as packages for coffee, sugar, dried fruits and nuts, and moist food packages, such as packages for sliced cheese, sliced meat and frozen food, and facial tissue packages are more easily used by consumers when the packages can be resealed after the initial opening.

Manufacturers have proposed numerous forms of integrated means to provide a way of resealing a package, such as a frozen food bag. Consumers have typically used tape, clamps, twist ties, etc. to reclose packages. However, these systems are not entirely satisfying to consumers. One solution to the resealing problem is to use a laminate with a pressure sensitive adhesive (PSA). If the adhesive is selected to provide removability, the consumer may open and reseal the package with the PSA laminate. The PSA laminate can provide easy application of the laminate, easy opening and closing of the package, and also writing or printing capabilities for identification of the package contents.

When the package contents require refrigeration or freezing, additional problems arise because of ice or moisture condensation within and/or on the packaging. The lower storage temperature and the resulting condensation pose problems for adhesive means of resealing containers.

A need exists for an adhesive article that provides resealing capabilities on packages stored at low temperatures, particularly for packages stored in refrigerators and freezers.

SUMMARY OF THE INVENTION

This invention relates to an adhesive article comprising (a) a moisture resistant substrate having a first and second surface, (b) a removable adhesive covering at least a portion of the first surface of the substrate and having a Moist Loop Test result of at least about 0.2 N/25 mm at a substrate temperature of 5° C.

In one embodiment of the present invention, the adhesive article comprises (a) a moisture resistant substrate having a first and second surface, (b) a permanent adhesive covering a first portion of the first surface, and (c) a removable adhesive covering a second portion of the first surface, the removable adhesive having a Moist Loop Test result of at least about 0.2 N/25 mm at a substrate temperature of 5° C. The adhesive articles are easily applied, and provide good adhesion performance, even in the presence of moisture from refrigerated or frozen food packaging environments.

The invention is further directed to a method of providing a reusable closure for packages, comprising (a) providing a package having a folding portion and a main portion wherein the folding portion is able to be folded over to at least partially cover the main portion of the package, (b) folding the portion over to close the package and (c) applying an adhesive article to the folded portion and the main portion so that the package remains closed, wherein the adhesive article comprises (i) a moisture resistant substrate having a first and second surface, and (ii) a removable adhesive covering at least a first portion of the first surface of the substrate, wherein the removable adhesive has a Moist Loop Test result of at least about 0.25 N/25 mm at a test plate temperature of 5° C. The adhesive article may further comprise a permanent adhesive on a second portion of the first surface of the substrate.

DETAILED DESCRIPTION OF THE PREFERRED EMBODIMENTS

As described above, the adhesive articles provide good adhesion and therefore closure properties to packaging, such as flexible food packaging. Typically, the adhesive strength is measured by the Loop Tack measurement (Finat Test Method, FTM 9). In this test, the adhesive loop is at the same temperature as the test plate to which the loop is adhered. In the present invention and claims, the adhesive strength is measured by the Moist Loop Tack measurement, abbreviated herein as MLT. This procedure is similar to the Loop Tack Test with the exception that the test plate holder is replaced with a test plate holder having a cooling system so that the temperature of the test plate can be varied from −10° C. to +15° C. The test plate holder is placed in a temperature cabinet, the temperature of which can be varied between −30° C. to +70° C. The tests are performed at 25° C. in a cabinet environment, with varying test plate temperatures to simulate various moisture condensation conditions. The stainless steel test plate is set to specified temperatures. The adhesive loop is lowered against the test plate and the measurements are taken as described in the Loop Tack test (FTM 9).

As described herein, the adhesive article has a removable adhesive on at least a portion of its surface. The removable adhesive may be the only adhesive present or may be present with a permanent adhesive. Where two adhesives are present, the permanent adhesive acts to anchor the substrate to the container. The removable adhesive provides enough strength to hold the container closed during normal handling. Normal handling is understood to include hand carrying the container, and placing the container in and removing the container from a refrigerator or freezer. The closures may be used on bags, boxes or any other container where sealing and resealing the container are desired.

Figure 1:
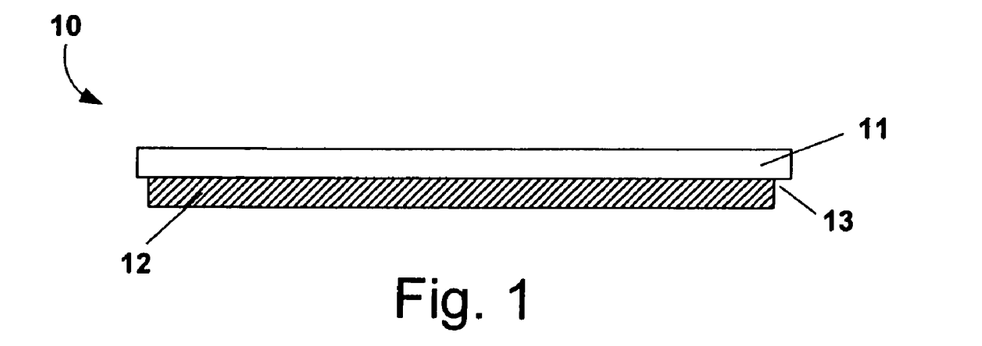
FIG. 1 is a cross sectional area of an adhesive article with a substrate having a removable adhesive.

Referring to the drawings, FIG. 1 is a cross sectional area of adhesive article 10 having a substrate 11. The substrate 11 has a first and second surface. On its first surface is adhered a removable adhesive 12. In one embodiment, the removable adhesive 12 completely covers the first surface of the substrate 11 (not shown). In another embodiment, the removable adhesive 12 covers only a portion of substrate 11 and leaves a lift tab 13. Lift tab 13 improves the ability of the user to remove the adhesive strip with fingernail pressure.

Figure 2:
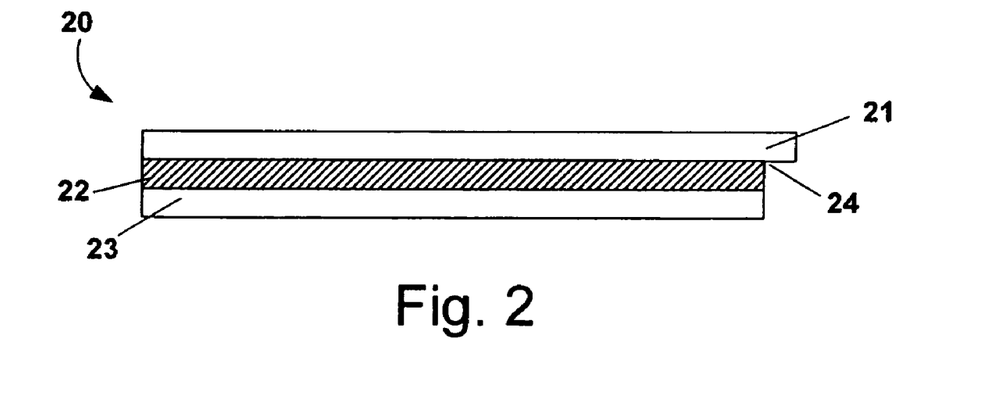
FIG. 2 is a cross sectional area of an adhesive article with a substrate having a removable adhesive and a release liner.

FIG. 2 is an adhesive article 20 having a substrate 21 with a first and second surface. On its first surface is removable adhesive 22. Removable adhesive 22 is also releasably adhered to release liner 23, such as a siliconized paper liner. In one embodiment, not shown, the removable adhesive 22 does not completely substrate 21, thus forming a lift tab 24. The lift tab provides easy separation of the substrate and the removable adhesive from the release liner.

Figure 3:
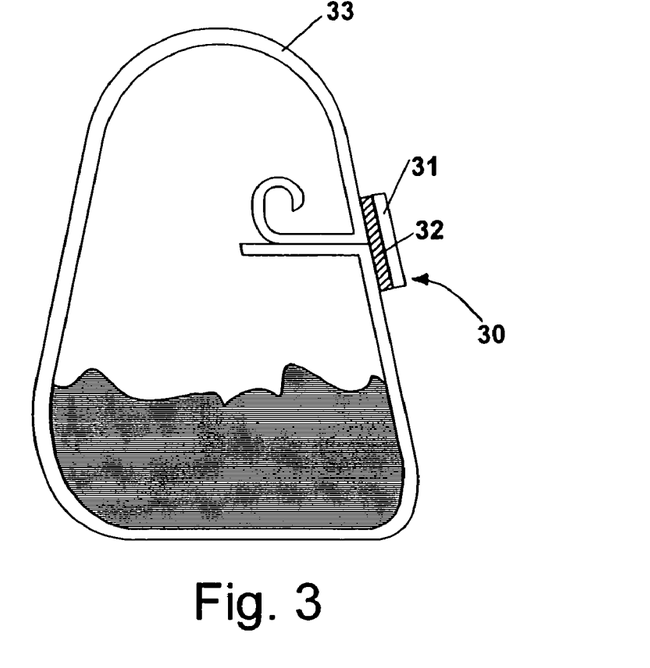
FIG. 3 is a cross sectional view of a flexible container, such as a bag, with the adhesive article of FIG. 1 as a closure strip.

FIG. 3 represents a cross sectional view of a package 33, to which adhesive article 30 is applied. Adhesive article 30 has a substrate 31 with removable adhesive 32. The adhesive article 30 is removably adhered to flexible packaging 33, which can be, for example, a frozen food bag. The removable adhesive 32 is adhered to two portions of the flexible package, a folded portion and a main portion. The opening of the package is within the folded portion. The application of adhesive article 30 to the package affects sealing of the package.

Substrate

The substrate of the adhesive article has a first and second surface. The substrate can comprise paper or a polymeric film, or a combination thereof. In one embodiment, the substrate has a thickness of from about 0.5 to about 15, or from about 1 to about 10, or from about 1.5 to about 7.5 mils. Here and elsewhere in the specification and claims, the range and ratio limits may be combined. Paper substrates must have sufficient moisture resistance to maintain their strength. An example of a useful paper substrate includes polyethylene coated paper.

The polymeric films useful in the present invention include polystyrenes, polyolefins, polyamides, polyesters, polycarbonates, polyvinyl alcohol, poly(ethylene vinyl alcohol), polyurethanes, polyacrylates, poly(vinyl acetates), ionomers and mixtures thereof. In one embodiment, the polymeric film material comprises a polyolefin. The polyolefin film materials generally are characterized as having a melt index or melt flow rate of less than 30, or less than 20, or less than 10, as determined by ASTM Test Method 1238.

The polyolefins that can be utilized as the polymeric film material include polymers and copolymers of ethylene, propylene, 1-butene, etc., or blends of such polymers and copolymers. In one embodiment, the polyolefins comprise polymers and copolymers of ethylene and propylene. In another embodiment, the polyolefins comprise propylene homopolymers, and copolymers such as propylene-ethylene and propylene-1-butene copolymers. Blends of polypropylene and polyethylene, or blends of either or both of them with polypropylene-polyethylene copolymer are also useful. In another embodiment, the polyolefin film material comprises a polyolefin with a very high propylenic content, either polypropylene homopolymer or propylene-ethylene copolymers or blends of polypropylene and polyethylene with low ethylene content, or propylene-1-butene copolymers or blend of polypropylene and poly-1-butene with low butene content.

Various polyethylenes can be utilized as the polymeric film material. Such polyethylenes include low, medium, and high density polyethylenes. An example of a useful low density polyethylene (LDPE) is Rexene 1017 commercially available from Huntsman.

The propylene homopolymers that can be utilized as the polymeric film material in the constructions of the invention, either alone, or in combination with a propylene copolymer as described herein, include a variety of propylene homopolymers such as those having melt flow rates (MFR) from about 0.5 to about 20 as determined by ASTM Test D 1238, condition L. In one embodiment, propylene homopolymers having MFR's of less than 10, or from about 4 to about 10 are particularly useful and provide substrates having improved die-cuttability. Useful propylene homopolymers also may be characterized as having densities in the range of from about 0.88 to about 0.92 g/cm$^3$. A number of useful propylene homopolymers are available commercially from a variety of sources, including: 5A97, available from Union Carbide and having a melt flow of 12.0 g/10 min and a density of 0.90 g/cm$^3$; DX5E66, also available from Union Carbide and having an MFI of 8.8 g/10 min and a density of 0.90 g/cm$^3$; and WRD5-1057 from Union Carbide having an MFI of 3.9 g/10 min and a density of 0.90 g/cm$^3$. Useful commercial propylene homopolymers are also available from Fina and Montel.

Particularly useful polyamide resins include resins available from EMS American Grilon Inc., Sumter, S.C. under the general tradename Grivory such as CF6S, CR-9, XE3303 and G-21. Grivory G-21 is an amorphous nylon copolymer having a glass transition temperature of 125° C., a melt flow index (DIN 53735) of 90 ml/10 min and an elongation at break (ASTM D638) of 15. Grivory CF65 is a nylon 6/12 film grade resin having a melting point of 135° C., a melt flow index of 50 ml/10 min, and an elongation at break in excess of 350%. Grilon CR9 is another nylon 6/12 film grade resin having a melting point of 200° C., a melt flow index of 200 ml/10 min, and an elongation at break at 250%. Grilon XE 3303 is a nylon 6.6/6.10 film grade resin having a melting point of 200° C., a melt flow index of 60 ml/10 min, and an elongation at break of 100%. Other useful polyamide resins include those commercially available from, for example, Union Camp of Wayne, N.J. under the Uni-Rez product line, and dimer-based polyamide resins available from Bostik, Emery, Fuller, Henkel (under the Versamid product line). Other suitable polyamides include those produced by condensing dimerized vegetable acids with hexamethylene diamine. Examples of polyamides available from Union Camp include Uni-Rez 2665; Uni-Rez 2620; Uni-Rez 2623; and Uni-Rez 2695.

Polystyrenes can also be utilized as the polymeric film material of the invention and these include homopolymers as well as copolymers of styrene and substituted styrene such as alpha-methyl styrene. Examples of styrene copolymers and terpolymers include: acrylonitrile-butene-styrene (ABS); styrene-acrylonitrile copolymers (SAN); styrene butadiene (SB); styrene-maleic anhydride (SMA); and styrene-methyl methacrylate (SMMA); etc. An example of a useful styrene copolymer is KR-10 from Phillip Petroleum Co. KR-10 is believed to be a copolymer of styrene with 1,3-butadiene.

Polyurethanes also can be utilized as the polymeric film material of the invention, and the polyurethanes may include aliphatic as well as aromatic polyurethanes.

Polyesters prepared from various glycols or polyols and one or more aliphatic or aromatic carboxylic acids also are useful film materials. Polyethylene terephthalate (PET) and PETG (PET modified with cyclohexanedimethanol) are useful film materials that are available from a variety of commercial sources including Eastman. For example, Kodar 6763 is a PETG available from Eastman Chemical. Another useful polyester from duPont is Selar PT-8307, which is polyethylene terephthalate.

Acrylate polymers and copolymers and alkylene vinyl acetate resins (e.g., EVA polymers) also are useful as the film material in the invention. Commercial examples of available polymers include Escorene UL-7520, a copolymer of ethylene with 19.3% vinyl acetate (Exxon); Nucrell 699, an ethylene copolymer containing 11% of methacrylic acid (duPont); etc.

Ionomers (polyolefins containing ionic bonding of molecular chains) also are useful. Examples of ionomers include ionomeric ethylene copolymers such as Surlyn 1706 (duPont) which is believed to contain interchain ionic bonds based on a zinc salt of ethylene methacrylic acid copolymer. Surlyn 1702 from duPont also is a useful ionomer.

Polycarbonates also are useful, and these are available from the Dow Chemical Co. (Calibre) G. E. Plastics (Lexan) and Bayer (Makrolon). Most commercial polycarbonates are obtained by the reaction of bisphenol A and carbonyl chloride in an interfacial process. Molecular weights of the typical commercial polycarbonates vary from about 22,000 to about 35,000, and the melt flow rates generally are in the range of from 4 to 22 g/10 min.

The polymeric film may contain inorganic fillers and other organic or inorganic additives to provide desired properties such as appearance properties (opaque or colored films), durability and processing characteristics. Nucleating agents can be added to increase crystallinity and thereby increase stiffness. Examples of useful additives include calcium carbonate, titanium dioxide, metal particles, fibers, flame retardants, antioxidant compounds, heat stabilizers, light stabilizers, ultraviolet light stabilizers, antiblocking agents, processing aids, acid acceptors, etc.

Various nucleating agents and pigments can be incorporated into the substrate films of the present invention. The amount of nucleating agent added should be an amount sufficient to provide the desired modification of the crystal structure while not having an adverse effect on the desired properties of the films. It is generally desired to utilize a nucleating agent to modify the crystal structure and provide a large number of considerably smaller crystals or spherulites to improve the transparency (clarity), and stiffness, and the diecuttability of the film. Nucleating agents that have been used heretofore for polymer films include mineral nucleating agents and organic nucleating agents. Examples of mineral nucleating agents include carbon black, silica, kaolin and talc. Among the organic nucleating agents that have been suggested as useful in polyolefin films include salts of aliphatic mono-basic or di-basic acids or aryalkyl acids such as sodium succinate, sodium glutarate, sodium caproate, sodium 4-methylvalerate, aluminum phenyl acetate, and sodium cinnamate. Alkali metal and aluminum salts of aromatic and alicyclic carboxylic acids such as aluminum benzoate, sodium or potassium benzoate, sodium betanaphtholate, lithium benzoate and aluminum tertiary-butyl benzoate also are useful organic nucleating agents. Substituted sorbitol derivatives such as bis (benzylidene) and bis (alkylbenzilidine) sorbitols wherein the alkyl groups contain from about 2 to about 18 carbon atoms are useful nucleating agents. More particularly, sorbitol derivatives such as 1,3,2,4-dibenzylidene sorbitol, 1,3,2,4-di-para-methylbenzylidene sorbitol, and 1,3,2,4-di-para-methylbenzylidene sorbitol are effective nucleating agents for polyproylenes. Useful nucleating agents are commercially available from a number of sources. Millad 8C-41-10, Millad 3988 and Millad 3905 are sorbitol nucleating agents available from Milliken Chemical Co.

The amounts of nucleating agent incorporated into the film formulations of the present invention generally range from about 100 to about 6000 ppm of the film. In another embodiment, the amount of nucleating agent in the range of about 1000 to about 5000 ppm.

The polymeric film is chosen to provide a substrate with one or more of the desired properties such as improved printability, strength, water resistance, gloss, die-cuttability and matrix strippability. It is particularly desirable that the outer (second) surface of the substrate can be printed or adapted to be printed with inks using printing techniques such as flexographic printing, screen printing, offset lithography, letter press, thermal transfer, etc., and that the applied ink has acceptable adhesion to the surface of the film of the adhesive article.

Many commercially available substrate may be used in the present invention. Examples of particularly useful substrates include FASTCLEAR®, PRIMAX®, and CRYSTAL FASTCLEAR™ films available from Avery Dennison Corporation.

The release liners that may be utilized in the adhesive article constructions of the present invention can consist of any of a variety of materials known to those of skill in the art to be suitable as release liners. In one particularly useful embodiment, the release liner comprises a silicone coated paper substrate.

Removable Adhesive

On at least a portion of the first surface of the substrate is a removable adhesive. The removable adhesive must be capable of forming a strong enough bond with the container to prevent the opening of the container during normal handling. Typically, the adhesive requires enough adhesive strength to hold the container closed during the transport, handling and storage of the container. The adhesive also must be able to be used repeatedly to attach to and release from the container. In one embodiment, the adhesive article is able to attach, detach and reattach to packages from 1 to about 100, or from 1 to about 20, or from 1 to about 12 times. In one embodiment, the adhesive must have the ability to function at the temperatures of refrigerator and freezer interiors, typically from about 10° C. to about −30° C.

In one embodiment, the removable adhesive has a Moist Loop Test (MLT) result of at least about 0.2, or at least about 0.25, or at least about 0.28, or at least about 0.5, or at least about 0.8 N/25 mm for a test plate at 5° C. The MLT is described above. In another embodiment, the removable adhesive has a $T_g$ from about −30 to about −70, or from about −35 to about −65, or from about −40 to about −60.

In one embodiment, the adhesive has a cohesive strength (G') at 5° C. of less than about 250,000, or less than about 200,000, or less than about 150,000 pascals. In another embodiment, the adhesive has a cohesive strength of less than about 125,000 pascals. In one embodiment, the removable adhesive has a cohesive strength of less than about 110,000 pascals. Cohesive strength (G') is the strength that holds a single material's molecules together. Specifically, as used in the art, G' is the dynamic storage shear modulus as determined by Method E of ASTM D4065-82 which provides dynamic mechanical analysis (DMA). G" is the dynamic loss shear modulus and determined by the same ASTM method. The ASTM analysis determines elastic modulus (or storage modulus, G'), viscous modulus (or loss modulus, G") and damping coefficient (tan D) as a function of temperature, frequency or time. Results are typically provided as a graphical plot of G', G", and tan D (the ratio of G' to G") versus temperature. DMA identifies transition regions in plastics, such as the glass transition, and may be used for quality control or product development. DMA can recognize small transition regions that are beyond the resolution of DSC (Differential Scanning Calorimetry). Under the test, the specimen is clamped between the movable and stationary fixtures, and then enclosed in the thermal chamber. Frequency, amplitude, and a temperature range appropriate for the material being tested are input. The Analyzer applies torsional oscillation to the test sample while slowly moving through the specified temperature range. Test specimens are typically 76×13×3 mm, cut from the center section of an ASTM Type I tensile bar, or an ISO multipurpose test specimen. The Rheometric Scientific RDA III Dynamic Mechanical Analyzer may be used to conduct the test.

In one embodiment, the removable adhesive comprises an acrylic based or rubber based pressure sensitive adhesive. The rubber based adhesives are typically hot melt or emulsion pressure sensitive adhesives.

In one embodiment, the removable adhesive comprises one or more rubber elastomers and a tackifier. The rubber elastomer(s) is generally present in an amount from about 20% to about 48%, or from about 25% to about 40%, or from about 28% to about 37% by weight of the removable adhesive. Useful rubber elastomers include the block polymers of styrene and dienes, as well as ethylene-propylene elastomers, including diene terpolymers, styrene olefin copolymers like styrene ethylene, propylene or butylene block polymers. Styrene diene polymers are particularly useful, such as styrene isoprene copolymers and styrene butadiene copolymers.

In another embodiment, the rubber elastomer comprises a mixture of triblock and diblock copolymers. The rubber elastomers are generally styrene isoprene or styrene butadiene block copolymers. The triblock content is typically from about 30% to about 70%, or from about 35% to about 65%, or from about 40% to about 60% by weight of the rubber elastomer. The diblock content is from about 70% to about 30%, or from about 65% to about 35%, or from about 60% to about 40% by weight of the rubber elastomer.

In one embodiment of the present invention, the removable adhesive comprises a mixture of two immiscible natural or synthetic elastomers, one based on a first polydiene, exhibiting a first glass transition temperature and a first value of tangent delta and the other based on a second polydiene, exhibiting a second glass transition temperature higher than the first and a second value of tangent delta associated therewith. A particularly useful first elastomer is polybutadiene and a particularly useful second elastomer is polyisoprene. The two elastomers are combined in proportion whereby there is exhibited two distinct glass transition temperature peaks in a DMS curve, a plot of tangent delta as a function of temperature in ° C. There is added to the composition a tackifying system that comprises tackifiers preferentially soluble in the second polydiene component that cause the temperature differential between the glass transition temperature peaks in the DMS curve to increase and the amplitude of the tangent delta for the second glass transition temperature to also increase. The net result is to provide a pressure-sensitive adhesive composition exhibiting improved conversion as seen in ability to cut the adhesive and, because of tangent delta peaks at low temperature approaching ambient, respective excellent low and ambient temperature pressure-sensitive adhesive performance. Such removable adhesives are described in detail in U.S. Pat. Nos. 5,290,842 and 5,663,228, both of which are incorporated by reference herein in their entirety.

The tackifier system of this embodiment consists of tackifiers that are preferentially miscible with the polydiene having the highest glass transition temperature (polyisoprene) and serves by preferential tackification to increase differential between the peaks and amplify the peak of the highest glass transition temperature. The tackifier system may also include normally liquid and solid tackifiers that leave unchanged or increase the glass transition temperature of the polyisoprene block and plasticizer oils which lower the glass transition temperature of the polyisoprene segment. Tackifier systems used in the practice of the instant invention, while including conventional tackifiers and plasticizer oils, must have the net effect of being preferentially soluble in the polyisoprene block so as to preferentially increase the difference between the glass transition temperature of the polyisoprene block component relative to the polybutadiene block component, with an increase (amplification) of the tangent delta of the polyisoprene peaks of the pressure-sensitive adhesive composition.

The polymers used in formulating the pressure-sensitive adhesives of this embodiment are based on natural and/or synthetic elastomeric polymers. Useful are AB, ABA and $(AB)_x$ block copolymers wherein x has a value of 3 or more and wherein A is a block comprising at least one monoalkenyl arene, preferably styrene, alpha methyl styrene, vinyl toluene and the like, and B is an elastomeric conjugated diene block, preferably a polybutadiene or a polyisoprene block. Preferably at least one is based on polybutadiene blocks and one other is based on polyisoprene blocks. These include, but are not limited to, homopolymers, block, random or multiarmed copolymers, and mixtures thereof. Among the useful elastomeric polymers there may be mentioned natural rubber (polyisoprene), polybutadiene, synthetic polyisoprene, random styrene-butadiene polymers, styrene-butadiene (SB) block copolymers, multiarmed and repeating (SB) copolymers, styrene-butadiene-styrene (SBS) block copolymers, styrene-isoprene (SI) block copolymers, styrene-isoprene-styrene (SIS) block copolymers, multiarmed styrene-isoprene $(SI)_x$ block copolymers, and the like. It will be understood that random copolymers may also be used and can reverse the diene preferentially tackified so long as the glass transition temperature of the polymer exhibiting the highest glass transition temperature is increased relative to the polymer of lower glass transition temperature.

Commercial elastomeric polymers used include linear SIS/SI block copolymers known as Kraton D-1107 and D-1112, SBS/SB block copolymers known as Kraton D-1101, D-1102 and DX-1300, and an $(SI)_x$ block copolymer known as Kraton D-1320X, all manufactured and sold by Shell Chemical Company, and an SB block copolymer known as Solprene 1205 manufactured and sold by Housemex, Inc. As indicated, in many of the SIS or SBS block copolymers, there are respectively present SI or SB components.

Other elastomers, such as the ethylene-propylene diene rubbers, styrene-ethylene/butylene, styrene block copolymers, styrene-ethylene/propylene-styrene block copolymers and the like, may also be used.

The weight ratio of the polybutadiene containing constituents of the mixture to the polyisoprene constituents of the mixture are such that there are provided two peaks on the DMS curve for the mixture. Generally, weight ratios range from about 0.5:1 upward. Compositions contemplated to be used in accordance with the instant invention are combined in ratio of about 0.5:1 to about 5:1, or about 1:1 to about 1.5:1, or from about 1.3:1.

Tackifier additives for the polyisoprene component are obtained by the polymerization of a stream of aliphatic petroleum derivatives in the form of dienes and mono-olefins containing 5 or 6 carbon atoms generally in accordance with the teachings of U.S. Pat. No. 3,577,398 to Pace and U.S. Pat. No. 3,692,756 to St. Cyr, both of which are incorporated herein by reference. The resultant hydrocarbons range from materials that are normally liquid at room temperature to those that are normally solid at room temperature and typically contain 40% or more by weight polymerized dienes. The dienes are typically piperylene and/or isoprene. They are sold by the Chemical Division of Goodyear Tire and Rubber Company as the Wingtack family of resins with the numerical designation being the softening point, e.g., Wingtack 95 which is normally a solid resin having a softening point of about 95° C. and Wingtack 10 which is normally a liquid resin having a softening point of about 10° C.

Other normally solid tackifiers are Escorez 1310 LC manufactured by Exxon and Piccotac 95 manufactured by Hercules.

Other additives that serve a tackifier function include hydrogenated aromatic resins wherein a very substantial portion, if not all, of the benzene rings are converted to cyclohexane rings (for example, the Regalrez family of resins manufactured by Hercules such as Regalrez 1018, 1033, 1065, 1078 and 1126, and Regalite R-100, and the Arkon family of resins from Arakwa Chemical such as Arkon P-85, P-100, P-115 and P-125), hydrogenated polycyclic resins (typically dicyclopentadiene resins such as Escorez 5300, 5320, 5340 and 5380 manufactured by Exxon) and the like.

There can be also added rosins, rosin esters, polyterpenes and other tackifiers that are compatible to some degree with the polyisoprene and polybutadiene phases. Other additives include plasticizer oils such as Shellflex 371 manufactured by Shell and Kaydol mineral oil manufactured by Witco which are soluble in both the polyisoprene and polybutadiene phases.

The tackifier system may be present in an amount, based on the total weight of tackifier system and elastomers, of from about 50% to about 80% by weight, or from about 50% to about 70% by weight, or from about 60% to about 70% by weight. In one embodiment, the ratio is about 38% by weight elastomer and about 62% by weight tackifying resin additive, the resin additive comprising a mixture of a normally solid tackifier such as Wingtack 95 of Escorez 1310 LC and a normally liquid tackifier such as Wingtack 10 or a plasticizer oil such as Shellflex 371. Polystyrene reinforcing additives may be present but are not required.

In considering the relative proportions of polybutadiene containing constituents to polyisoprene containing constituents, there is shown in Table 1 the relative tangent delta contributions of the polybutadiene (PB) and polyisoprene (PI) constituents. With reference thereto, at a ratio of 0.4:1 only one glass transition temperature peak is exhibited and the tangent delta is high, indicating a high amount of energy loss in cutting any pressure-sensitive adhesive formulated from the mixture. At higher proportions of polybutadiene to polyisoprene, there are exhibited two glass transition temperature peaks and the tangent delta values are lower showing lower overall energy being required for cutting of a formulated pressure-sensitive adhesive.

TABLE 1

| PB/PI | PB Tg (° C.) | Tan Delta Max | PI Tg | Tan Delta Max |
|---|---|---|---|---|
| 0.4/1.0 | — | — | −57 | 1.64 |
| 1.0/1.0 | −80 | 0.45 | −54 | 0.71 |
| 1.3/1.0 | −77 | 0.64 | −54 | 0.56 |
| 1.5/1.0 | −81 | 0.7 | −55 | 0.50 |
| 2.5/1.0 | −77 | 0.76 | −54 | 0.41 |
| 5.0/1.0 | −82 | 0.84 | −54 | 0.33 |

In another embodiment, the removable adhesive comprises an acrylic pressure sensitive adhesive. For example, the pressure sensitive adhesive may comprise a 2-ethylhexyl acrylate/polar monomer copolymer emulsion containing a nonionic C7 to C18 alkylphenoxypoly(ethyleneoxy) ethanol having at least 70 ethyleneoxy units. A variety of acrylic pressure sensitive adhesives that are useful include acrylic copolymers having from about 70-98% by weight of one or more monofunctional acrylates having nontertiary alkyl groups with between 1 and 14 carbon atoms and from about 30-2% by weight of a polar monomer.

In one embodiment the acrylic adhesive is a copolymer of ethylenically-unsaturated higher alkyl acrylates (C4-C14) such as isooctylacrylate (IOA), 2-ethylhexyl acrylate, 2-methylbutylacrylate (MBA), n-butyl acrylate, methylacrylate (MA), ethylacrylate, and isobornylacrylate (IBA). The polar monomer can comprise ethylenically-unsaturated carboxylic acids such as methacrylic acids, acrylic acids (AA), itaconic acids, β-carboxyethylacrylates, fumaric acid, acrylamides or other polar monomers such as N-vinyl pyrrolidone, N-vinyl caprolactam, 2-hydroxyethyl acrylate, and the like.

Among the specific acrylic adhesives having utility in the present invention is isooctyl acrylate/acrylic acid (IOA/AA) 93/7 wt/wt modified with 16.4 parts by weight (based on 100 parts by weight of adhesive solids) Nirez 2019, (a terpenephenolic tackifier commercially available from Arizona Chemical). This adhesive has an inherent viscosity of 1.75 dl/g in ethyl acetate at a concentration of 0.2 g/dl. Another useful acrylic adhesive comprises 2-methyl butyl acrylate/acrylic acid (2-MBA/AA) 90/10 wt/wt. This pressure sensitive adhesive has an inherent viscosity of 0.8 dl/g in ethyl acetate at a concentration of 0.2 g/dl. Yet another useful acrylic is isooctyl acrylate/methyl acrylate/acrylic acid (IOA/MA/AA) 70/22.5/7.5 wt/wt. This adhesive has an inherent viscosity of 0.8 dl/g in ethyl acetate at a concentration of 0.2 g/dl. A further useful acrylic adhesive comprises 2-methyl butyl acrylate/acrylamide (2-MBA/Am) 96/4 wt/wt. This PSA has an inherent viscosity of 0.6 dl/g in ethyl acetate at a concentration of 0.2 g/dl. Blends of these acrylic adhesives can also be used.

In one embodiment, the removable acrylic adhesive comprises a crosslinking agent. Two main types of crosslinking additives are commonly used. The first type of crosslinking additive is a thermal crosslinking additive. Such chemical crosslinkers can be added into solvent-based PSAs after polymerization and activated by heat during oven drying of the coated adhesive. An example of a thermal crosslinking agent is a multifunctional aziridine, such as 1,1'-(1,3-phenylene dicarbonyl)-bis-(2-methylaziridine) (CAS No. 7652-64-4), referred to herein as "Bisamide". In another embodiment, chemical crosslinkers that rely upon free radicals to carry out the crosslinking reaction may be employed. Reagents such as, for example, peroxides function as a precursor source of free radicals. When heated sufficiently, these precursors will generate free radicals that bring about a crosslinking reaction of the polymer chains. A common free radical generating reagent is benzoyl peroxide. Free radical generators are typically required only in small quantities, and generally require higher temperatures to complete the crosslinking reaction than those required for the bisamide reagent.

The second type of chemical crosslinker is a photosensitive crosslinker that is activated by high intensity ultraviolet (UV) light. Two common photosensitive crosslinkers used for hot melt acrylic PSAs are benzophenone and 4-acryloxybenzophenone which is copolymerized into the PSA polymer. Another photocrosslinker that can be post-added to the solution polymer and activated by UV light is a triazine, for example 2,4-bis(trichloromethyl)-6-(4-methoxy-phenyl)-s-triazine. These crosslinkers are activated by UV light generated from artificial sources such as medium pressure mercury lamps. Depending on the type of crosslinker, no more than about 0.5% by weight of chemical crosslinker typically is needed to achieve the desired crosslinking.

Commercially available acrylic pressure sensitive adhesives include Techcryl 5014 or Techcryl 5017 available from DynaTech Adhesives, Inc. Another commercially available acrylic adhesive is UVR145 from Avery Dennison Corporation. Commercially available rubber based adhesives include C2075 from Avery Dennison Corporation and Primagrip 38-026 from Sovereign Chemicals.

Permanent Adhesive

In one embodiment of the invention, a permanent adhesive is adhered to a portion of the surface of the substrate. The term permanent refers to the attachment or anchoring of the substrate to the container. The adhesive is not easily removable and reattachable. Generally, the substrate, adhesive layer and/or package is damaged by attempts to remove the adhesive.

Figure 4:
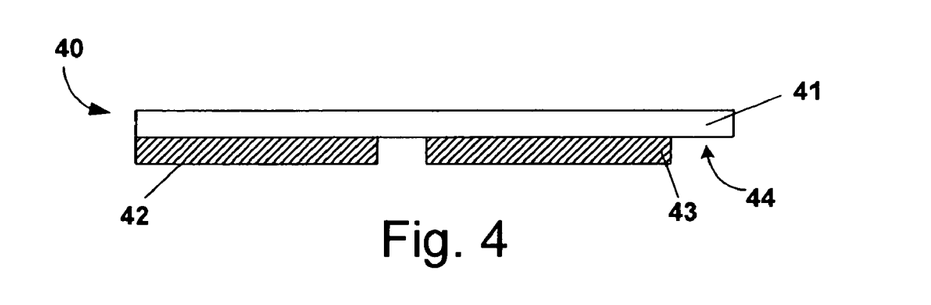
FIG. 4 is a cross sectional view of an adhesive article with a substrate having a permanent adhesive on a first portion and removable adhesive on a second portion of one of its surfaces.

Referring to the figures, FIG. 4 is a cross sectional area of a closure 40 having a substrate 41, with first and second surfaces. On a portion of the first surface of substrate 41 is permanent adhesive 42. The area covered by the permanent adhesive is typically from 10% to about 90%, or from about 25% to about 75%, or from about 45% to about 65% of the total area of the first surface of the substrate. On a second portion of the first surface of the substrate 41 is removable adhesive 43. The area covered by the removable adhesive 43 is 10% to about 90%, or from about 25% to about 75% or from about 45% to about 65% of the total area of the first surface of the substrate. In one embodiment, not shown, the permanent and removable adhesives together completely cover the surface the first surface of substrate 41. It is understood that there could be a small separation between the two adhesives that is formed by the manufacturing processes. In another embodiment, the permanent and removable adhesives together do not completely cover the first surface of substrate 41. In this embodiment, a lift tab 44 is formed by leaving a section of the first surface of substrate 41 near the edge uncovered by the removable adhesive 43.

Figure 5:
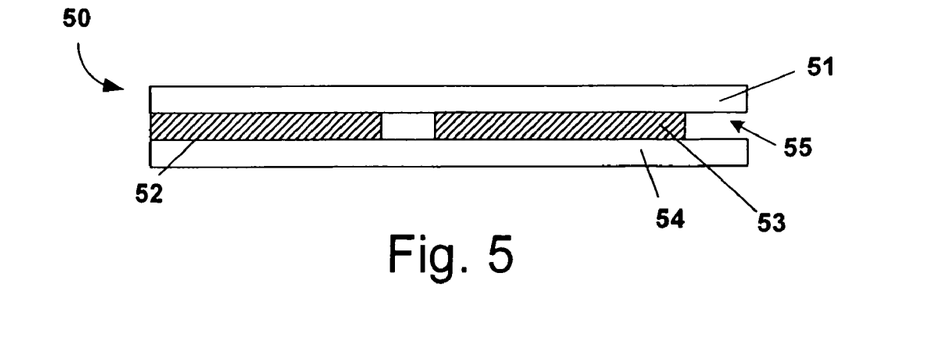
FIG. 5 is a cross sectional view of an adhesive article with a permanent adhesive on a first portion and removable adhesive on a second portion of one surface of the substrate and a release liner covering the adhesives.

FIG. 5 is a cross sectional view of a closure 50, having a substrate 51 with a permanent adhesive 52 on a first portion of its first surface. A removable adhesive 53 is on a second portion of the first surface of substrate 51. The permanent adhesive 52 and removable adhesive 53 are releasably adhered to a release liner 54. In one embodiment, the removable adhesive 53 and permanent adhesive 52 do not completely cover the first surface of substrate 51, forming a lift tab 55.

Figure 6:
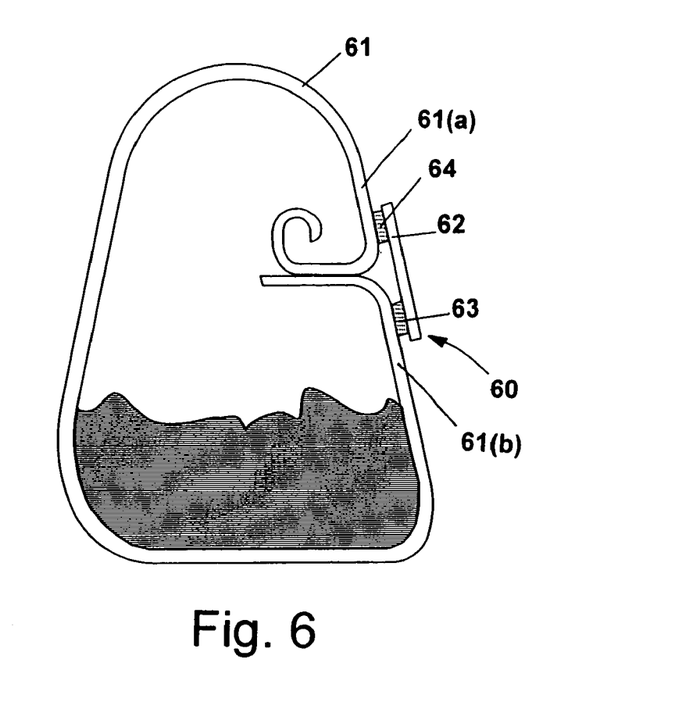
FIG. 6 is a cross sectional area of a flexible package, such as a bag, with adhesive article of FIG. 4 as a closure for the package.
Figure 6A:
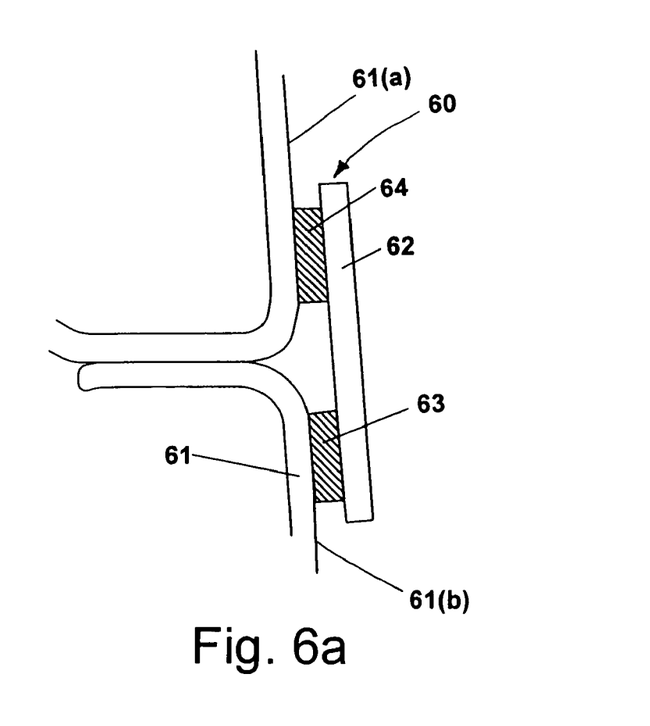
FIG. 6a is a cross sectional area of the area of attachment of the adhesive article to the flexible package.

FIG. 6 is a cross sectional view of a flexible package 61 to which closure 60 is applied. Closure 60 is made up of substrate 62 having a first portion of its inner surface covered by permanent adhesive 63 and a second portion of its inner surface covered by removable adhesive 64. FIG. 6a is an expanded view of the attachment of closure 60 to package 61. Package 61 includes a folded portion 61(a) and a main portion 61(b). The opening of the package is within the folded portion. Closure 60 is permanently adhered to main portion 61(b) by permanent adhesive 63 and releasably adhered to folded portion 61(a) by removable adhesive 64. Package 61 is sealed by adhering removable adhesive 64 to folded portion 61(a) and can be opened by peeling back the portion of substrate 62 to which removable adhesive 64 is applied, leaving the portion of substrate 62 to which permanent adhesive 63 is applied adhered to main portion 61(b). It should be understood that the placement of the removable adhesive 64 and the permanent adhesive 63 is for illustration purposes only. For example, the permanent adhesive and removable adhesive positions on the flexible package 61 can be reversed.

The permanent adhesive can comprise a heat-activated adhesive, a hot melt adhesive, or a pressure sensitive adhesive (PSA). Typically, the adhesive compositions have a viscosity of from 1000 poise to 1,000,000 poise at the processing temperature.

The pressure sensitive adhesives include rubber based adhesives, acrylic adhesives, vinyl ether adhesives, silicone adhesives, and mixtures of two or more thereof. Included are the pressure sensitive adhesive materials described in "Adhesion and Bonding", Encyclopedia of Polymer Science and Engineering, Vol. 1, pages 476-546, Interscience Publishers, 2nd Ed. 1985, the disclosure of which is hereby incorporated by reference. The pressure sensitive adhesive materials that are useful may contain as a major constituent an adhesive polymer such as acrylic type polymers, block copolymers, natural, reclaimed or styrene butadiene rubbers, tackified natural or synthetic rubbers, random copolymers of ethylene and vinyl acetate, ethylene-vinyl-acrylic terpolymers, polyisobutylene, poly(vinyl ether), etc. The pressure sensitive adhesive materials are typically characterized by glass transition temperatures in the range of about $-70°$ C. to about $10°$ C.

In one embodiment, the permanent pressure sensitive adhesive comprises an acrylic adhesive such as those that are homopolymers, copolymers or cross-linked copolymers of at least one acrylic or methacrylic component. Examples include acrylic esters such as methyl acrylate, ethyl acrylate, n-propyl acrylate, isopropyl acrylate, n-butyl acrylate, isobutyl acrylate, tert-butyl acrylate, amyl acrylate, hexyl acrylate, octyl acrylate, 2-ethylhexyl acrylate, undecyl acrylate or lauryl acrylate, and optionally as a comonomer, a carboxyl-containing monomer such as (meth)acrylic acid [the expression "(meth)acrylic" acid denotes acrylic acid and methacrylic acid], itaconic acid, crotonic acid, maleic acid, maleic anhydride or butyl maleate, a hydroxyl-containing monomer such as 2-hydroxyethyl(meth)acrylate, 2-hydroxypropyl(meth)acrylate or allyl alcohol, an amido-containing monomer such as (meth)acrylamide, N-methyl(meth)acrylamide, or N-ethyl-(meth)acrylamide, a methylol group-containing monomer such as N-methylol(meth)acrylamide or dimethylol(meth)acrylamide, an amino-containing monomer such as aminoethyl(meth)acrylate, dimethylaminoethyl (meth)acrylate or vinylpyridine, or a non-functional monomer such as ethylene, propylene, styrene or vinyl acetate; mixtures thereof, and adhesives containing at least one such adhesives as a main component.

In one embodiment, acrylic adhesive base resins comprise multi-polymers based upon a mixture of monomers and typified as comprising lower glass transition temperature esters, Such acrylic adhesives provide sufficient viscoelastic flow to assure adequate build-up of adhesion.

Useful acrylic based pressure sensitive adhesives include those described in U.S. Pat. No. 5,164,444 (Bernard), U.S. Pat. No. 5,623,011 (Bernard) and U.S. Pat. No. 6,306,982 (Lee). The adhesive can also comprise a rubber-based adhesive, such as those described in U.S. Pat. No. 5,705,551 (Sasaki). The adhesive can also comprise a radiation curable mixture of monomers with initiators and other ingredients, such as those described in U.S. Pat. No. 5,232,958 (Ang) and U.S. Pat. No. 5,232,958 (Mallya). The disclosures of these patents as they relate to adhesives are hereby incorporated by reference. The pressure sensitive adhesives include emulsion, solvent based and hot melt pressure sensitive adhesives.

Another useful acrylic PSA comprises a blend of emulsion polymer particles with dispersion tackifier particles as generally described in Example 2 of U.S. Pat. No. 6,306,982. The polymer is made by emulsion polymerization of 2-ethylhexyl acrylate, vinyl acetate, dioctyl maleate, acrylic and methacrylic comonomers as described in U.S. Pat. No. 5,164,444 (Bernard), resulting in the latex particle size of about 0.2 microns in weight average diameters and a gel content of about 60%.

Useful permanent adhesives include those classified into the following categories:

(1) Random copolymer adhesives such as those based upon acrylate and/or methacrylate copolymers, a-olefin copolymers, silicone copolymers, chloroprene/acrylonitrile copolymers, and the like, and (2) Block copolymer adhesives including those based upon linear block copolymers (i.e., A-B and A-B-A type), branched block copolymers, star block copolymers, grafted or radial block copolymers, and the like, and Natural and synthetic rubber adhesives. A description of useful pressure-sensitive adhesives may be found in *Encyclopedia of Polymer Science and Engineering*, Vol. 13. Wiley-Interscience Publishers (New York, 1988). Additional description of useful pressure-sensitive adhesives may be found in *Encyclopedia of Polymer Science and Technology*, Vol. 1, Interscience Publishers (New York, 1964).

Commercially available pressure-sensitive adhesives are useful in the invention. Examples of these adhesives include the hot melt pressure-sensitive adhesives available from H. B. Fuller Company, St. Paul, Minn. as HM-1597, HL-2207-X, HL-2115X, HL-2193-X. Other useful commercially available pressure-sensitive adhesives include those available from Century Adhesives Corporation, Columbus, Ohio.

Conventional PSAs, including silicone-based PSAs, rubber-based PSAs, and acrylic-based PSAs are useful. Another commercial example of a hot melt adhesive is H2187-01, sold by Ato Findley, Inc., of Wauwatusa, Wis. In addition, rubber based block copolymer PSAs described in U.S. Pat. No. 3,239,478 (Harlan) also can be utilized in the coextruded adhesive constructions of the present invention, and this patent is hereby incorporated by a reference for its disclosure of such hot melt adhesives.

In one embodiment, the pressure sensitive adhesive utilized in the present invention comprise rubber based elastomer materials such as linear, branched, graft or radial block copolymers represented by the diblock structures A-B, the triblock A-B-A, the radial or coupled structures $(A-B)_n$, and combinations of these where A represents a hard thermoplastic phase or block which is non-rubbery or glassy or crystalline at room temperature but fluid at higher temperatures, and B represents a soft block which is rubbery or elastomeric at service or room temperature. These thermoplastic elastomers may comprise from about 75% to about 95% by weight of rubbery segments and from about 5% to about 25% by weight of non-rubbery segments.

The non-rubbery segments or hard blocks comprise polymers of mono- and polycyclic aromatic hydrocarbons, and more particularly vinyl-substituted aromatic hydrocarbons which may be monocyclic or bicyclic in nature. The rubbery blocks or segments are polymer blocks of homopolymers or copolymers of aliphatic conjugated dienes. Rubbery materials such as polyisoprene, polybutadiene, and styrene butadiene rubbers may be used to form the rubbery block or segment. Particularly rubbery segments include polydienes and saturated olefin rubbers of ethylene/butylene or ethylene/propylene copolymers. The latter rubbers may be obtained from the corresponding unsaturated polyalkylene moieties such as polybutadiene and polyisoprene by hydrogenation thereof.

The block copolymers of vinyl aromatic hydrocarbons and conjugated dienes which may be utilized include any of those which exhibit elastomeric properties. The block copolymers may be diblock, triblock, multiblock, starblock, polyblock or graftblock copolymers. Throughout this specification and claims, the terms diblock, triblock, multiblock, polyblock, and graft or grafted-block with respect to the structural features of block copolymers are to be given their normal meaning as defined in the literature such as in the *Encyclopedia of Polymer Science and Engineering*, Vol. 2, (1985) John Wiley & Sons, Inc., New York, pp. 325-326, and by J. E. McGrath in *Block Copolymers, Science Technology*, Dale J. Meier, Ed., Harwood Academic Publishers, 1979, at pages 1-5.

Such block copolymers may contain various ratios of conjugated dienes to vinyl aromatic hydrocarbons including those containing up to about 40% by weight of vinyl aromatic hydrocarbon. Accordingly, multi-block copolymers may be utilized which are linear or radial symmetric or asymmetric and which have structures represented by the formulae A-B, A-B-A, A-B-A-B, B-A-B, $(AB)_{0, 1, 2}$ . . . BA, etc., wherein A is a polymer block of a vinyl aromatic hydrocarbon or a conjugated diene/vinyl aromatic hydrocarbon tapered copolymer block, and B is a rubbery polymer block of a conjugated diene.

The block copolymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As well known, tapered copolymer blocks can be incorporated in the multi-block copolymers by copolymerizing a mixture of conjugated diene and vinyl aromatic hydrocarbon monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference.

Conjugated dienes which may be utilized to prepare the polymers and copolymers are those containing from 4 to about 10 carbon atoms and more generally, from 4 to 6 carbon atoms. Examples include from 1,3-butadiene, 2-methyl-1,3-butadiene (isoprene), 2,3-dimethyl-1,3-butadiene, chloroprene, 1,3-pentadiene, 1,3-hexadiene, etc. Mixtures of these conjugated dienes also may be used. The conjugated dienes are isoprene and 1,3-butadiene.

Examples of vinyl aromatic hydrocarbons which may be utilized to prepare the copolymers include styrene and the various substituted styrenes such as o-methylstyrene, p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromostyrene, 2-chloro4-methylstyrene, etc. The vinyl aromatic hydrocarbon is styrene.

Many of the above-described copolymers of conjugated dienes and vinyl aromatic compounds are commercially available. The number average molecular weight of the block copolymers, prior to hydrogenation, is from about 20,000 to about 500,000, from about 40,000 to about 300,000.

The average molecular weights of the individual blocks within the copolymers may vary within certain limits. In most instances, the vinyl aromatic block will have a number average molecular weight in the order of about 2000 to about 125,000, and between about 4000 and 60,000. The conjugated diene blocks either before or after hydrogenation will have number average molecular weights in the order of about 10,000 to about 450,000 and from about 35,000 to 150,000.

Also, prior to hydrogenation, the vinyl content of the conjugated diene portion generally is from about 10% to about 80%, and the vinyl content is from about 25% to about 65%, particularly 35% to 55% when it is desired that the modified block copolymer exhibit rubbery elasticity. The vinyl content of the block copolymer can be measured by means of nuclear magnetic resonance.

Specific examples of diblock copolymers include styrene-butadiene (SB), styrene-isoprene (SI), and the hydrogenated derivatives thereof. Examples of triblock polymers include styrene-butadiene-styrene (SBS), styrene-isoprene-styrene (SIS), alpha-methylstyrene-butadiene-alpha-methylstyrene, and alpha-methylstyrene-isoprene alpha-methylstyrene. Examples of commercially available block copolymers useful as the adhesives in the present invention include those available from Shell Chemical Company and listed in the following Table 2.

TABLE 2

| Kraton | Type | Styrene/Rubber Ratio (w) | Melt Index |
|---|---|---|---|
| D1101 | Linear SBS | 31/69 | <1 |
| D1107P | Linear SIS | 15/85 | 11 |
| D1111 | Linear SIS | 22/78 | 3 |
| D1112P | Linear SIS | 15/85 | 23 |
| D1113P | Linear SIS | 16/84 | 24 |
| D1117P | Linear SIS | 17/83 | 33 |
| D1320X | Multi-arm $(SI)_n$ | 10/90 | NA |

Vector 4111 is an SIS block copolymer available from Dexco of Houston Tex.

Upon hydrogenation of the SBS copolymers comprising a rubbery segment of a mixture of 1,4 and 1,2 isomers, a styrene-ethylene-butylene styrene (SEBS) block copolymer is obtained. Similarly, hydrogenation of an SIS polymer yields a styrene-ethylene propylene-styrene (SEPS) block copolymer.

The selective hydrogenation of the block copolymers may be carried out by a variety of well known processes including hydrogenation in the presence of such catalysts as Raney nickel, noble metals such as platinum, palladium, etc., and soluble transition metal catalysts. Suitable hydrogenation processes which can be used are those wherein the diene-containing polymer or copolymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block copolymers which are carried out in a manner and to extent as to produce selectively hydrogenated copolymers having a residual unsaturation content in the polydiene block of from about 0.5% to about 20% of their original unsaturation content prior to hydrogenation.

In one embodiment, the conjugated diene portion of the block copolymer is at least 90% saturated and more often at least 95% saturated while the vinyl aromatic portion is not significantly hydrogenated. Particularly useful hydrogenated block copolymers are hydrogenated products of the block copolymers of styrene-isoprene-styrene such as a styrene-(ethylene/propylene)-styrene block polymer. When a polystyrene-polybutadiene-polystyrene block copolymer is hydrogenated, it is desirable that the 1,2-polybutadiene to 1,4-polybutadiene ratio in the polymer is from about 30:70 to about 70:30. When such a block copolymer is hydrogenated, the resulting product resembles a regular copolymer block of ethylene and 1-butene (EB). As noted above, when the conjugated diene employed as isoprene, the resulting hydrogenated product resembles a regular copolymer block of ethylene and propylene (EP).

A number of selectively hydrogenated block copolymers are available commercially from Shell Chemical Company under the general trade designation "Kraton G." One example is Kraton G1652 which is a hydrogenated SBS triblock comprising about 30% by weight of styrene end blocks and a midblock which is a copolymer of ethylene and 1-butene (EB). A lower molecular weight version of G1652 is available from Shell under the designation Kraton G1650. Kraton G1651 is another SEBS block copolymer which contains about 33% by weight of styrene. Kraton G1657 is an SEBS diblock copolymer which contains about 13% w styrene. This styrene content is lower than the styrene content in Kraton G1650 and Kraton G1652.

In another embodiment, the selectively hydrogenated block copolymer is of the formula: $B_n(AB)_oA_p$; wherein n=0 or 1; o is 1 to 100; p is 0 or 1; each B prior to hydrogenation is predominantly a polymerized conjugated diene hydrocarbon block having a number average molecular weight of about 20,000 to about 450,000; each A is predominantly a polymerized vinyl aromatic hydrocarbon block having a number average molecular weight of from about 2000 to about 115,000; the blocks of A constituting about 5% to about 95% by weight of the copolymer; and the unsaturation of the block B is less than about 10% of the original unsaturation. In other embodiments, the unsaturation of block B is reduced upon hydrogenation to less than 5% of its original value, and the average unsaturation of the hydrogenated block copolymer is reduced to less than 20% of its original value.

The block copolymers may also include functionalized polymers such as may be obtained by reacting an alpha, beta-olefinically unsaturated monocarboxylic or dicarboxylic acid reagent onto selectively hydrogenated block copolymers of vinyl aromatic hydrocarbons and conjugated dienes as described above. The reaction between the carboxylic acid reagent in the graft block copolymer can be effected in solutions or by a melt process in the presence of a free radical initiator.

The preparation of various selectively hydrogenated block copolymers of conjugated dienes and vinyl aromatic hydrocarbons which have been grafted with a carboxylic acid reagent is described in a number of patents including U.S. Pat. Nos. 4,578,429; 4,657,970; and 4,795,782, and the disclosures of these patents relating to grafted selectively hydrogenated block copolymers of conjugated dienes and vinyl aromatic compounds, and the preparation of such compounds are hereby incorporated by reference. U.S. Pat. No. 4,795,782 describes and gives examples of the preparation of the grafted block copolymers by the solution process and the melt process. U.S. Pat. No. 4,578,429 contains an example of grafting of Kraton G1652 (SEBS) polymer with maleic anhydride with 2,5-dimethyl-2,5-di(t-butylperoxy)hexane by a melt reaction in a twin screw extruder.

Examples of commercially available maleated selectively hydrogenated copolymers of styrene and butadiene include Kraton FG1901X, FG1921X, and FG1924X from Shell, often referred to as maleated selectively hydrogenated SEBS copolymers. FG1901X contains about 1.7% w bound functionality as succinic anhydride and about 28% w of styrene. FG1921X contains about 1% w of bound functionality as succinic anhydride and 29% w of styrene. FG1924X contains about 13% styrene and about 1% bound functionality as succinic anhydride.

Useful block copolymers also are available from Nippon Zeon Co., 2-1, Marunochi, Chiyoda-ku, Tokyo, Japan. For example, Quintac 3530 is available from Nippon Zeon and is believed to be a linear styrene-isoprene-styrene block copolymer.

The polymer film materials and adhesive compositions used to form the constructions of the present invention may be neat, or they may be emulsions or solvent-based. Emulsion and solvent-based acrylic based PSAs are known and described in, for example, U.S. Pat. Nos. 5,639,811 and 5,164,444, respectively, and these patents are hereby incorporated by reference for such disclosures. When emulsions of the film materials and/or adhesive compositions are used, the water may be removed in an extruder by using the process described and claimed in U.S. Pat. No. 5,716,669 (LaRose et al).

As mentioned above, in one embodiment, the adhesive compositions comprise thermoplastic elastomers comprising at least one thermoplastic elastomeric block copolymer which include linear, branched, graft or radial block copolymers. In addition, the adhesive compositions that are coextruded also contain at least one solid tackifier resin component. A solid tackifier is defined herein as one having a softening point above 80° C. When the solid tackifier resin component is present, the coextrudable pressure-sensitive adhesive compositions generally comprise from about 40 to about 80% by weight of a thermoplastic elastomer component and from about 20% to about 60% by weight (from about 55 to 65% by weight) of a solid tackifier resin component. The solid tackifier reduces the modulus of the mixture sufficiently to build tack or adhesion. Also, solid tackifiers (particularly the higher molecular weight solid tackifiers (e.g., Mw greater than 2000) and those having a lower dispersity (Mw/Mn=less than about 3) are less sensitive to migration into the polymer film layer, and this is desirable, since migration of tackifier into the polymer film substrate causes dimensional instability, and the constructions can swell and/or wrinkle, and may become too soft. In addition, the constructions may lose adhesive properties or cause blocking, and the ability of the polymer film to be printed satisfactorily may be reduced by migration of the tackifier. For example, attempts to print the polymeric film layer after migration of tackifier or other components from the adhesive layer may result in poor anchorage of the ink and/or blurring of the printing. Migration of the tackifier and other components present in the adhesive layer is a particular problem when the polymer film comprises a polyolefin such as polyethylene.

Conventional solid tackifier resins include hydrocarbon resins, rosin, hydrogenated rosin, rosin esters, polyterpene resins, and other resins which exhibit the proper balance of properties. A variety of useful solid tackifier resins are available commercially such as terpene resins which are sold under the trademark Zonatac by Arizona Chemical Company, and petroleum hydrocarbons resins such as the resins sold under the trademark Escorez by Exxon Chemical Company. One particular example of a useful solid tackifier is Escorez 2596 which is a $C_5$-$C_9$ (aromatic modified aliphatic) synthetic tackifier having an Mw of 2100 and a dispersity (Mw/Mn) of 2.69. Another useful solid tackifier is Escorez 1310LC, identified as an aliphatic hydrocarbon resin having an Mw of 1350 and a dispersity of 1.8. Wingtack 95 is a synthetic tackifier resin available from Goodyear, Akron, Ohio consisting predominantly of polymerized structure derived from piperylene and isoprene.

The permanent adhesive may contain a liquid rubber, i.e., liquid at room temperature. The liquid rubbers generally will have an Mw of at least 5,000 and more often at least 20,000. Incorporation of liquid rubbers in amounts of less than 10%, and even less than 5% by weight based on the overall weight of the adhesive formulation results in adhesives which is coextrudable with the polymeric film materials. The incorporation of a liquid rubber also produces an adhesive having increased tack and adhesion. Liquid block copolymers such as liquid styrene-isoprene block copolymers are particularly useful. For example, Kraton LVSI-101, available from the Shell Chemical Company, is effective in lowering the modulus of the adhesive, and it has been found, surprisingly, that this liquid styrene-isoprene block copolymer functions as a processing aid, improving the smoothness of the flow of the adhesive from the die. Kraton LVSI-101 has a weight average molecular weight of about 40,000. Another example of a useful liquid rubber is a liquid polyisoprene obtained by depolymerization of high molecular weight polyisoprene. An example of a commercially available depolymerized high molecular weight polyisoprene is Isolene D-400 from Elementis Performance Polymers, Belleville, N.J., and this liquid rubber has an Mw of about 20,000. Other liquid rubbers which may be incorporated into the adhesive mixture include liquid styrene-butadiene rubbers, liquid butadiene rubbers, ethylene-propylene rubbers, etc.

The adhesives may also contain mineral oil such as white mineral oil in amounts of from about 0.01 to about 15 or 20% by weight. In one embodiment, the adhesive formulation contains from about 5% to about 15% by weight of a mineral oil. An example of a useful commercial white mineral oil is Kaydol Oil from Witco Chemical.

The adhesives may contain inorganic fillers and other organic and inorganic additives to provide desired properties. Examples of useful fillers include calcium carbonate, titanium dioxide, metal particles, fibers, etc. An example of a useful end-block reinforcing agent is CUMAR® LX509 from Neville Resins.

The adhesive compositions also may include other materials such as antioxidants, heat and light stabilizers, ultraviolet light absorbers, fillers, colorants, antiblocking agents, reinforcing agents, processing acids, etc. Hindered phenolic and amine antioxidant compounds may be included in the adhesive compositions, and a wide variety of such antioxidant compounds are known in the art. A variety of antioxidants are available from Ciba-Geigy under the general trade designations "Irganox" and "Irgafos". For example, the hindered phenolic antioxidant n-octadecyl 3-(3,5-di-t-butyl-4-hydroxyphenol)-proprionate is available under the general trade designation "Irganox 1076". Irganox 1010, is identified as Tetrakis (methylene 3-(3',5'-di-tert-butyl-4'-hydroxyphenol) proprionate)methane. Irgafos 168 is another useful antioxidant from Ciba-Geigy.

Hydroquinone-based antioxidants also may be utilized, and one example of such an antioxidant is 2,5-di-tertiary-amyl-hydroquinone.

Light stabilizers, heat stabilizers, and UV absorbers also may be included in the adhesive compositions. Ultraviolet absorbers include benzo-triazol derivatives, hydroxy benzyl phenones, esters of benzoic acids, oxalic acid, diamides, etc. Light stabilizers include hindered amine light stabilizers, and the heat stabilizers include dithiocarbamate compositions such as zinc dibutyl dithiocarbamate.

Useful commercially available permanent adhesives include the rubber-based adhesives S2045 and C2500 from Avery Dennison Corporation.

Adhesive Articles

As described herein, the adhesive article has at least one removable adhesive on its surface. The removable adhesive may be present alone or in combination with a permanent adhesive. The adhesive articles can be used as a closure for packages, especially flexible frozen food packages. These adhesive articles are particularly useful at cold temperatures. The adhesive articles may include a release liner that is removed prior to applying the adhesive article to the package. In one embodiment, a plurality of individual adhesive articles are die-cut on the release liner. The individual adhesive articles are easily removed with thumb pressure or by use of a lift tab.

Figure 7A:
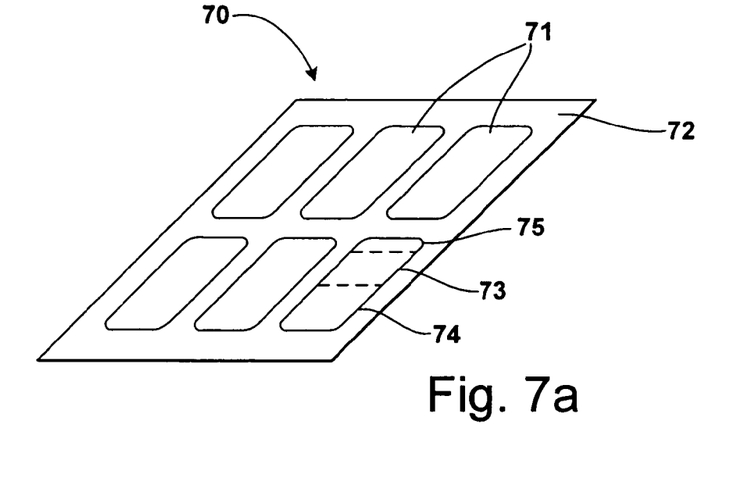
FIG. 7a is an individual adhesive article according to one embodiment of the invention.
Figure 7B:
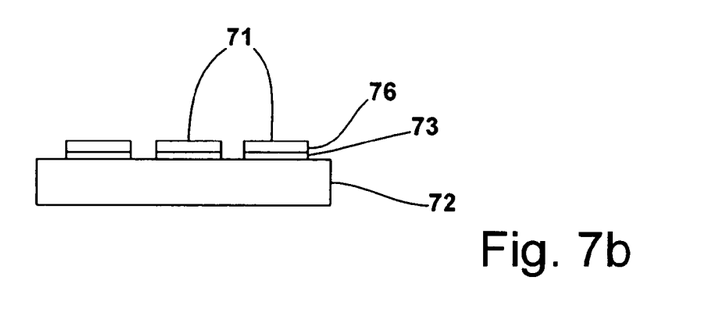
FIG. 7b is a plurality of adhesive articles according to one embodiment of the invention on a sheet.

These adhesive articles can be provided individually or collectively on a sheet, as illustrated in FIGS. 7a and 7b. In this embodiment, a sheet 70 of individual adhesive closures 71 on a release liner 72 is provided. Each adhesive closure 71 has a removable adhesive 73 covering at least a portion of the surface of substrate 76 that faces release liner 72. The adhesive closure optionally contains a permanent adhesive portion 74 and a lift tab 75.

Figure 8:
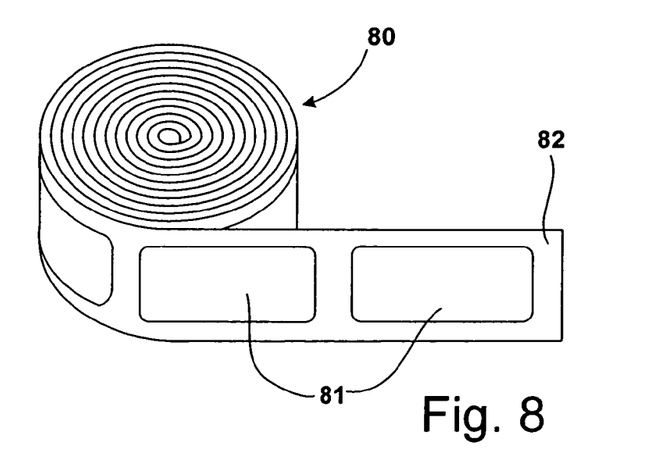
FIG. 8 is a plurality of adhesive articles according to one embodiment of the invention on a roll/tape.

The adhesive articles may also be supplied in a tape or roll form, as illustrated in FIG. 8. In this embodiment, a roll 80 of individual adhesive closures 81 on a wound release carrier 82 is provided. The individual adhesive closures may comprise the adhesive article of FIG. 1 or FIG. 4.

The adhesive articles are prepared by coating or extruding the removable adhesive onto a first surface of the substrate. The adhesive may be coated by means any known to those in the art. If a permanent adhesive is also provided on the substrate surface, the permanent adhesive may be applied to the substrate simultaneously or sequentially with the removable adhesive. The permanent adhesive functions to anchor the closure onto the surface of the container. The releasable portion of the closure seals the container when applied to a folded edge of the container. The adhesives are typically coated onto the substrate at independent thicknesses and coat weights, ranging from about 10 to about 50, or from about 15 to about 35, or from about 18 to about 25 grams per square meter (gsm).

While the invention has been explained in relation to its embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. An adhesive article comprising (a) a moisture resistant substrate having a first and second surface, (b) a removable and resealable adhesive adhered to at least a first portion of the first surface of the substrate, and (c) a permanent adhesive adhered to at least a second portion of the first surface of the substrate; wherein the removable adhesive is removable and resealable in the presence of moisture from refrigerated or frozen food packaging environments and has a Moist Loop Test result of at least about 0.8 N/25 mm at a test plate temperature of 5° C.

2. The article of claim 1 wherein the moisture resistant substrate comprises a polymer coated paper facestock.

3. The article of claim 1 wherein the moisture resistant substrate comprises a monolayer or multilayer polymeric film.

4. The article of claim 1 wherein the substrate comprises a multilayer film.

5. The article of claim 1 wherein the substrate comprises a film selected from polystyrenes, polyolefins, polyamides, polyesters, polycarbonates, polyurethanes, polyacrylates, polyvinyl alcohol, poly(ethylene vinyl alcohol), poly(alkylene vinyl acetates), poly(alkylene acrylates), ionomers, and mixtures thereof.

6. The article of claim 1 wherein the substrate comprises a polyolefin film.

7. The article of claim 1 wherein the substrate comprises an ethylene or propylene polymer or copolymer.

8. The article of claim 1 wherein the removable adhesive comprises an acrylic based pressure sensitive adhesive.

9. The article of claim 1 wherein the removable adhesive comprises a UV curable hot melt acrylic adhesive.

10. The article of claim 1 where the removable adhesive comprises a hot melt pressure sensitive adhesive.

11. The article of claim 1 wherein the removable adhesive comprises a rubber based adhesive.

12. The article of claim 1 wherein the permanent adhesive comprises a rubber based adhesive, an acrylic adhesive, a vinyl ether adhesive, a silicone adhesive, or mixtures of two or more thereof.

13. The article of claim 1 wherein the permanent adhesive comprises an acrylic based or rubber based pressure sensitive adhesive.

14. A sheet of adhesive closures comprising:
a carrier sheet having a release surface; and
a plurality of adhesive articles releasably adhered to the release surface of the sheet, each article comprising (a) a moisture resistant substrate having a first and second surface, (b) a removable and resealable adhesive adhered to at least a first portion of the first surface of the substrate, and (c) a permanent adhesive adhered to at least a second portion of the first surface of the substrate; wherein the removable adhesive is removable and resealable in the presence of moisture from refrigerated or frozen food packaging environments and has a Moist Loop Test result of at least about 0.8 N/25 mm at a test plate temperature of 5° C.

15. A roll of adhesive closures comprising:
a wound carrier having a release surface; and
a plurality of adhesive articles releasably adhered to the release surface of wound carrier, each article comprising (a) a moisture resistant substrate having a first and second surface, (b) a removable and resealable adhesive adhered to at least a first portion of the first surface of the substrate, and (c) a permanent adhesive adhered to at least a second portion of the first surface of the substrate; wherein the removable adhesive is removable and resealable in the presence of moisture from refrigerated or frozen food packaging environments and has a Moist Loop Test result of at least about 0.8 N/25 mm at a test plate temperature of 5° C.

16. The adhesive article of claim 1 wherein the removable and resealable adhesive is removable and resealable at temperatures within the range of from about 10° C. to about −30° C.

17. The adhesive article of claim 14 wherein the permanent adhesive comprises a rubber based adhesive, an acrylic adhesive, a vinyl ether adhesive, a silicone adhesive, or mixtures of two or more thereof.

18. The adhesive article of claim 14 wherein the permanent adhesive comprises an acrylic based or rubber based pressure sensitive adhesive.

19. The adhesive article of claim 14 wherein the removable adhesive comprises a UV curable hot melt acrylic adhesive.

* * * * *